Aug. 2, 1966     T. AITKEN ETAL     3,264,174
ALKALI METAL ALUMINATE MODIFIED STARCH AND PROCESS
OF PREPARING PAPER THEREWITH
Filed Jan. 29, 1964
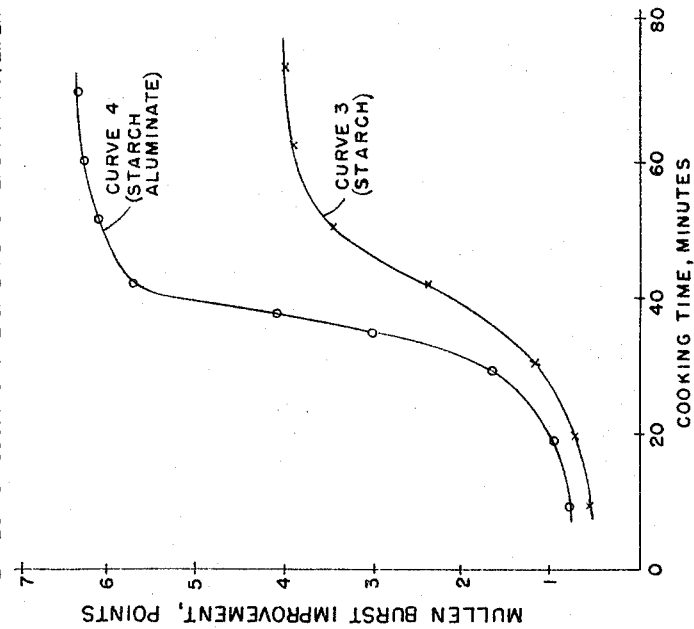
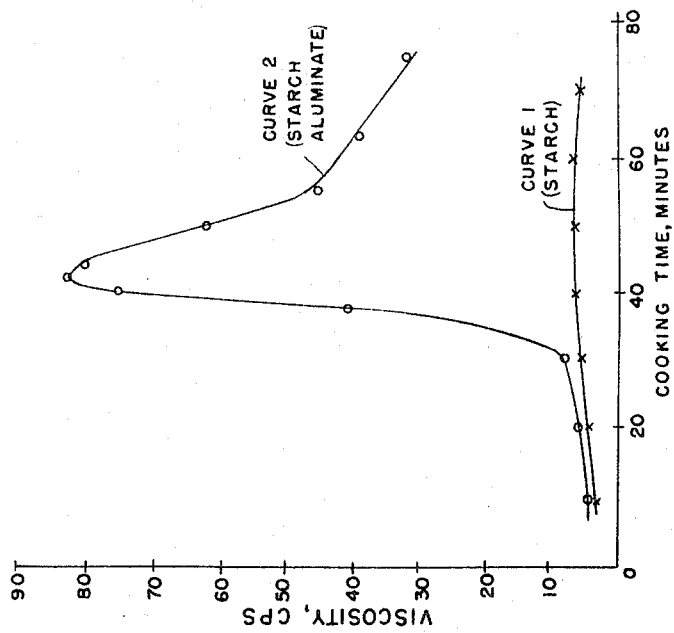
INVENTORS:
THOMAS AITKEN
WILLIAM V. CROSS
FRED W. WEBKING
BY *Marzall, Johnston,
Cook & Root*
ATT'YS United States Patent Office 3,264,174
Patented August 2, 1966

3,264,174
ALKALI METAL ALUMINATE MODIFIED STARCH AND PROCESS OF PREPARING PAPER THEREWITH
Thomas Aitken, Chicago, Ill., and William V. Cross, Lake Oswego, and Fred W. Webking, Eugene, Oreg., assignors to Nalco Chemical Company, Chicago, Ill., a corporation of Delaware
Filed Jan. 29, 1964, Ser. No. 341,054
6 Claims. (Cl. 162—175)

This application is a continuation-in-part of our copending application, Serial No. 256,507, filed February 6, 1963, now abandoned.

This invention relates to a process for manufacturing paper. It is particularly concerned with the manufacture of paper having improved dry strength and other improved properties. The invention is further concerned with novel starch compositions useful in producing paper products and also with a method of improving the use of starch as an agent for addition to paper products during their manufacture.

Starches of various types have been used in the production of paper for many years. Indicative of this widespread usage are the various uses of starch described in the article by M. L. Cushing and K. R. Schuman, "Fiber Attraction and Interfiber Bonding—The Role of Polysaccharide Additives," which appears in the December 1959 issue of TAPPI.

One of the chief difficulties in using starch as a wet end additive for improving various papers is that it is difficult to adequately retain the starch on the sheet. In most instances the majority of starch added is lost in the papermaking process. Many attempts have been made to improve retention of starch by cellulosic fibers.

In some instances attempts have been made to thermally modify starch. In other instances starch has been treated with chemicals in attempts to render it more susceptible to being retained by fibers. While both of these approaches have met with some measure of success in improving the retention characteristics of starches, they oftentimes increase the cost of starches to the point where their addition to papermaking stocks is economically impractical.

It would be advantageous to the art of papermaking if it were possible to provide a simple method for improving the ability of starch to be retained by cellulosic fibers. Also of interest would be a paper manufacturing process which in a series of operational steps, would render the cellulosic fibers receptive to treatment with common starches which have been simply modified by inexpensive inorganic chemicals commonly used in the manufacture of paper.

By improving the receptivity of cellulosic fibers to common starches modified with simple inorganic chemicals, it should be possible to produce paper having a greater amount of starch contained therein. This will afford a finished sheet having superior dry strength and many other improved characteristics which flow from the incorporation therewith of bonded well dispersed starches.

Based on the above it is therefore an object of the invention to provide an improved process for the manufacture of paper.

Another object is to provide a method whereby starch may be inexpensively and simply modified so that when used in conjunction with other chemicals, it is highly receptive to cellulosic fibers.

A further object is to furnish a method for simply modifying starch to produce a starch product of extreme value to the papermaking industry. Other objects will appear hereafter.

In accordance with the invention it has been found that an improved paper product may be provided by treating a papermaking stock prior to its formation into the sheet, with an alkali metal aluminate modified starch. It has been further discovered that paper may be improved by utilizing the combination treatment of a water dispersible organic cationic colloid in conjunction with the alkali metal aluminate modified starch.

In the first embodiment described above it has been found that simple inexpensive starches may be reacted with alkali metal aluminates under certain conditions to produce a superior papermaking material.

The starches susceptible to modification with the alkali metal aluminates are for example potato, corn, tapioca, and other related readily available starches. While the simple starches are preferred due to their availability and low price it will be understood that other starch type polysaccharides may be employed. In some cases degraded wood celluloses may be utilized.

The alkali metal aluminates, e.g., sodium, potassium, cesium and rubidium aluminates, while all being useful as modifiers for the starch, they are not all commercially available. It is therefore desirable to use the well-known and readily available sodium aluminate.

There are many forms of sodium aluminate available, but it is beneficial to utilize a relatively pure form as exemplified by "Nalco 680 SP" sodium aluminate. A typical analysis of this product is presented below:

Color _____ White.
Odor _____ None.
Max. solubility at 75° F. ____ 80 parts in 100 parts water.
Density _____ 50 lbs./cu. ft.
Insoluble _____ Less than 0.2%.
$Na_2O/Al_2O_3$ molecular ratio . 1.15/1.0.
$Al_2O_3$ _____ 46.0.
$Na_2O$ _____ 30.0.
Fe _____ 0.01.
Ca and Mg _____ None.
Si _____ None.
Heavy metals _____ None.
As _____ None.

Other sodium aluminates that may be used are described in U.S. 2,345,134.

The starch and alkali metal aluminate when reacted are preferably provided as a relatively dilute aqueous suspension which contains from 1–30% by weight of the reactants and preferably 1–15% by weight. An amount of sodium aluminate or other alkali metal aluminate is present in relation to the starch so as to provide 1–30% of the aluminate and preferably 6–20%, in relationship to and based upon the weight of the starch.

The aqueous suspensions of the starch and the alkali metal aluminates are reacted or cooked at a temperature of 60° C., to a temperature not in excess of 100° C. The cooking time may range to as long as several hours with a preferred cooking time being 20 minutes to between 1½–2 hours.

It has been discovered that the strength-imparting ability of the alkali metal aluminate-starch reaction product is a function of the viscosity of the suspension during preparation. If starch alone is prepared according to the preferred method an increase of viscosity is noted with increased cooking time. When starches such as corn pearl starch, or unmodified beater starch, or tapioca starch are used, only a small increase in viscosity is noticed and this increase reaches a maximum over a relatively long period of time. However, when these same starches are cooked with an alkali metal aluminate, a much greater increase in viscosity is observed, with a definite maximum peak being reached.

These factors may be better understood by reference to the drawings, FIGURE 1 of which is a graph showing the effect of cooking time on the viscosity of both a starch suspension and a starch aluminate suspension. FIGURE 2 shows the effect of cooking time on paper dry strength improvement.

Curve 1 of FIGURE 1 represents a 2% by weight aqueous suspension of an unmodified beater starch which was heated by a constant heat source from 30 C. to 95° C., in a period of 40 minutes. The temperature was maintained at 92–95° C., for an additional 40 minutes. Curve 2 represents a 1.7% by weight aqueous suspension of an unmodified beater starch containing 15% by weight of sodium aluminate, based on the starch weight. The heating cycle was identical to that of Curve 1. The viscosity was measured with a Brookfield Viscometer. A Model LVF No. 2 spindle was used at 60 r.p.m.

The increase in viscosity is attributed to the swelling of the starch particles, and in fact, the viscosity is an excellent indicator of the extent of particle swelling.

At various points in the cooking cycle of these two starch suspensions, samples were withdrawn and used as dry strength agents at a dosage of 1.25% total solids, based on the dry weight of paper. The procedure of Example 1 below was used for the preparation and testing of the dry strength paper. The results are shown in FIGURE 2 of the drawing, where Curve 3 represents the burst strength improvements for the starch suspension and Curve 4 represents the burst strength improvements for the starch-aluminate suspension.

The importance of the increase in viscosity can better be seen in the light of the effect of cooking time on the Mullen burst strength. It is known that a certain amount of cooking is required before a significant amount of burst strength improvement will be noticed. FIGURE 2 illustrates this effect. The unmodified starch shows a gradual increase in burst strength that reaches a maximum improvement of approximately four Mullen burst points. The aluminate-treated starch, however, produces a rapid increase in burst strength to over six Mullen burst points and attains a much higher level of strength at a more rapid rate in terms of cooking time.

A comparison of FIGURES 1 and 2 shows that the point just before the maximum viscosity in the aluminate-starch reaction product occurs at approximately 40 minutes of cooking time. At this same 40 minutes of cooking time, effectively all of the burst strength improvement has been realized. Thus, the viscosity of a starch-aluminate solution is seen to directly indicate the degree of burst improvement that has been achieved.

It is a preferred embodiment of this invention to heat a reaction product of starch and an alkali metal aluminate in a suspension until the viscosity of the solution reaches at least 75% of its maximum value. Therefore, the cooking time should be at least sufficient to allow the viscosity to reach 75% of the maximum. Most preferably, cooking should continue for a few minutes beyond this point, in order that maximum burst strength improvement be obtained.

As can further be observed in comparison of Curves 2 and 4, the maximum burst strength may be achieved by using a starch-alkali metal aluminate cooked to a point following attainment of maximum viscosity, until the viscosity begins to decrease. In the practical application of the maximum viscosity criteria, it has been found that visual observation may be sufficient to determine the time at which the viscosity is decreasing. The reaction is then terminated at this point. This is an obvious benefit to large-scale operations of this process. Plant operators can easily attain maximum process efficiency and product quality measured in terms of the maximum burst strength improvement, by simply monitoring viscosity of the cook by visual observations.

The above described treated starch product may be used as an aqueous suspension or the water may be removed by means such as vacuum filtration, to provide a dry powdery material which is easily dispersed into the wet end of the papermaking process.

To illustrate the efficacy of the above products for improving papermaking operations the following is presented by way of example:

EXAMPLE 1

Unbleached softwood kraft of 22 seconds Williams slowness was used.

Two portions of Fiber Bond Starch were cooked, one without and one with "Nalco 680 SP" Sodium Aluminate.

As one of the portions just mentioned, 20 grams of starch were disposed in 980 gm. water, and with continuous stirring, heated to 95° C., in 30 minutes. It was maintained at 95–85° C., for 20 minutes before allowing to cool to room temperature.

For the second portion containing 15% "Nalco 680 SP" by weight of starch, 17 gm. of starch were dispersed in water, 3 gm. "Nalco 680 SP" Sodium Aluminate were dissolved in water, the two were mixed together and then diluted to one liter, to give a 2% by total weight starch-sodium aluminate mixture. This mixture was heated in the same way as was the portion containing starch alone. Resulting pH on cooling was 10.5. The viscosity appeared to be decreasing at this point near the end of the run.

Thirty gram samples of pulp at 3% consistency in water were treated in two series as follows:

(a) Fiber Bond Starch, 2.4% alum.
(b) 85% Fiber Bond Starch—15% "Nalco 680 SP" mixture, alum to bring the total alum-aluminate to 2.4% expressed as alum.

For series (a), starch applications were 0.625, 1.25 and 5.0% based on the weight of the pulp and for series (b), starch-aluminate applications were 0.625, 1.25, 2.5 and 5.0% based on the weight of the pulp.

Chicago tap water was used throughout. Handsheets were prepared on a Noble & Wood machine. For series (a), pH at the headbox was adjusted to 5.0; for series (b), pH at the headbox was adjusted to 6.0. Sulfuric acid was used for acidification on the machine. Gravity drainage was used, without white water recirculation. Sheet making and test data are given in Table I.

Table I

SHEET MAKING AND TEST DATA FOR WORK WITH FIBER BOND STARCH

Stock—Unbleached softwood Kraft, 22 sec. Wm. Slow.
Water—Chicago tap, $H_2SO_4$, used for pH adjustment.
Sheet making—Gravity drainage, no white water recirculation.

| Set No. | 3% Stock Slurry | | | Total Aluminate and Alum Expressed as Alum | Headbox, pH | pH | Burst, p.s.i. | Basis, Weight Percent |
|---|---|---|---|---|---|---|---|---|
| | Starch, Percent | Nalco 680 SP | Alum, Percent | | | | | |
| *Fiber Bond Starch* | | | | | | | | |
| 779 | 0.625 | | 2.4 | 2.4 | 4.5 | 5.0 | 45.7 | 99.5 |
| 780 | 1.25 | | 2.4 | 2.4 | 4.6 | 5.2 | 48.0 | 101.6 |
| 781 | 2.50 | | 2.4 | 2.4 | 4.6 | 5.1 | 50.4 | 102.8 |
| 782 | 5.0 | | 2.4 | 2.4 | 4.7 | 5.2 | 52.4 | 101.4 |
| *85% Fiber Bond Cooked with 15% Nalco 680 SP* | | | | | | | | |
| 783 | 0.53 | 0.09 | 2.14 | 2.4 | 4.6 | 6.1 | 44.4 | 100.5 |
| 784 | 1.06 | 0.19 | 1.88 | 2.4 | 4.9 | 6.1 | 48.8 | 102.5 |
| 785 | 2.12 | 0.38 | 1.36 | 2.4 | 6.0 | 6.0 | 57.4 | 103.8 |
| 786 | 4.25 | 0.75 | 0.32 | 2.4 | 8.7 | 6.3 | 63.0 | 105.2 |
| *Blank* | | | | | | | | |
| 770 | | | | | | 5.5 | 40.0 | 100.0 |

It should be noted in the above examples that after treating the stock with the sodium aluminate modified starch the pH of the system was adjusted with alum to a slightly acidic range. As a general rule it is desirable that this pH adjustment step be incorporated into the practices of the invention. The pH may be adjusted between 4.5–7.0 with a preferred range being 4.5–6.0.

An extremely important concept of the invention resides in the treatment of cellulosic fiber suspensions with a water dispersible organic cationic colloid prior to treatment with starch and sodium or other alkali metal aluminates. The amount of cationic colloid may be as little as 0.1 to 3% based on the weight of an aqueous paper pulp.

While any number of water dispersible cationic organic colloids may be used, a preferred class may be found in the condensation polymers of alkylene polyamines and halohydrin. Exemplary polymers of this type are those disclosed in J. Green U.S. 2,969,302 the disclosure of which is incorporated herein by reference.

A preferred polyamine polymer of the type described in Green U.S. 2,969,302 is "Nalco AX2" which is generically defined as an aqueous solution containing 10–30% by weight of a high molecular weight epihalohydrin alkylene polyamine condensation copolymer and at least a stabilizing amount of a reducing agent, said aqueous solution being further characterized as having a viscosity of at least 200 cps., when measured as an aqueous solution containing 20% by weight of said condensation copolymer at 75° F.

The above described polymers, while representing a preferred group of materials, only represent one class of cationic water dispersible polymers. Other polymers are for example condensation products of alkylene dihalides and alkylene polyamines, epichlororydrin and ammonia, formaldehyde and alkylene polyamines and the well-known homopolymers of the alkylene imines, e.g., polyethyleneamine.

Water soluble addition polymers containing cathionic groups may also be employed. Typical are the copolymers of allyl amine and diallyl amine with other monomers e.g., acrylamide acrylic acid, vinyl acetate, and the like. Similarly copolymers of the alkyl substituted amino acrylates and vinyl pyridines are also suitable for use in the practices of the invention.

In addition to using polymers it is also contemplated that certain nitrogen compounds may be used. For example, fatty substituted amines and fatty substituted quaternary ammonium compounds may be employed. Illustrative of such compounds are octadecylamine (its acetate or hydrochloride salts), octadecyl trimethyl ammonium chlorides, 1-(2-hydroxy-ethyl) 2-heptadecenyl-1-benzyl imidazolinium chloride.

When using the water dispersible organic cationic colloid with the alkali metal aluminate starch it is also important that the pH of the pulp prior to sheet formation be adjusted with an acidic material, preferably alum as previously mentioned above.

To illustrate the above described embodiment of the invention the following is presented by way of example.

EXAMPLE 2

For this study, unbleached softwood kraft pulp of 21 seconds Williams slowness was used.

Deionized water was used in preparing the starches. The "Nalco 680 SP" Sodium Aluminate was cooked with the starches. 6% "Nalco 680 SP" based on the weight of starch, was first dissolved in water, and the starch added to give a 2% by total weight starch slurry. The suspension was heated to about 95° C., in 30 minutes and maintained at 95–85° C., for 20 minutes before cooling to room temperature. The viscosity was decreasing at this point near the end of the run.

Chemical additions to the pulp were made at 3% stock consistency, with continuous rapid mixing. In all cases, "Nalco AX2" application was 0.15% by weight of pulp. Order of chemical addition was as follows:

"Nalco AX2," Starch with "Nalco 680 SP," alum.

The alum charge was such that total "Nalco 680 SP" and alum, expressed as alum was 2.4%. Chicago tap water was used in sheet making. Sulfuric acid was used to adjust pH to 6.0 in the proportioner and headbox. Gravity drainage was used, without white water recirculation.

Sheet making data and test results are given in Table II.

Table II
SHEET MAKING AND TEST DATA

Stock—Unbleached softwood kraft, 21 sec. Wm. Slow.
Water—Chicago tap, $H_2SO_4$ used for pH adjustment in proportioner and headbox.
Sheet making—Gravity drainage, no white water recirculation.

| Set No. | 3% Stock Slurry | | | Alum, Percent | pH | Headbox, pH | Burst, Percent | Basis Weight Percent (on 100 gm./m.$^2$) |
|---|---|---|---|---|---|---|---|---|
| | Nalco AX2, Percent | Starch Starch, Percent | Blend 680 SP, Percent | | | | | |
| Blank | | | | | | | | |
| 1 | | | | | 7.2 | 6.0 | 43.2 | 100 |
| Milo Starch | | | | | | | | |
| 2 | 0.15 | 0.625 | 0.04 | 2.3 | 4.5 | 6.0 | 57.5 | 105 |
| 3 | 0.15 | 1.25 | 0.07 | 2.1 | 4.5 | 6.0 | 55.7 | 104 |
| 4 | 0.15 | 2.5 | 0.15 | 2.0 | 4.7 | 6.0 | 63.0 | 103 |
| 5 | 0.15 | 5.0 | 0.30 | 1.8 | 5.2 | 6.0 | 63.0 | 103 |
| Potato Starch | | | | | | | | |
| 6 | 0.15 | 0.625 | 0.04 | 2.3 | 4.4 | 6.0 | 61.9 | 105 |
| 7 | 0.15 | 1.25 | 0.07 | 2.1 | 4.5 | 6.0 | 65.7 | 104 |
| 8 | 0.15 | 2.5 | 0.15 | 2.0 | 4.7 | 6.0 | 71.1 | 103 |
| 9 | 0.15 | 5.0 | 0.20 | 1.8 | 5.2 | 6.0 | 76.2 | 103 |

The invention allows common starches to be utilized as papermaking additives with good results being obtained in nearly all cases. It has been observed that the best results are obtained when the starch contains at least some amylopectin in combination with amylose. It is contemplated that amyloacetin may be used as a starch material.

Specialty starches such as British gums, dextrins, and the like may also be utilized as a starchy material although the invention is directed toward the utilization of common non-modified starches.

It is interesting to note that the use of alkali metal aluminates as a chemical useful in combination with starch as a reactant is unique. Experimental studies were conducted by substituting sodium hydroxide for sodium aluminate in the treatment of starch when used as an adjunct to the pretreatment of the paper pulp with a water dispersible organic cationic colloid. In all cases the starch retention was in no way improved by the use of caustic.

Papers treated according to the invention, in addition to having improved dry strength oftentimes will have other improved characteristics such as for example improved internal bond, fold, tensile and pick resistance.

The invention allows a smaller amount of starch to be employed and yet achieve results comparable to those obtained by excessive loadings of conventional starch treatments. In many instances the invention provides finished papers which are similar in properties and characteristics, to papers which have been treated with expensive cationic modified starches of the type, for example, described in Caldwell et al. U.S. 2,813,093.

Typical paper stocks that may be treated are kraft, bleach kraft, softwood kraft, hardwood kraft, bleached and unbleached sulfites, groundwood and alpha sulfite.

We claim.

1. A process for the production of paper having improved dry strength and other improved properties which comprises the sequential steps of forming an aqueous cellulosic fiber suspension, adding to said suspension at a point prior to its formation into a sheet, an alkali metal aluminate modified starch, said modified starch having been prepared by cooking an aqueous suspension of a starch with from 1–30% by weight of an alkali metal aluminate based on the weight of the starch in said suspension at a temperature of at least 60° C. and less than 100° C., for at least sufficient time for the viscosity of said suspension to reach 75% of its maximum, adjusting the pH of the thus treated cellulosic fiber suspension to between 4.5 and 7.0, and then forming said aqueous cellulosic fiber suspension into a sheet.

2. The process of claim 1 wherein said cooking has been continued after attainment of maximum starch-alkali metal aluminate viscosity, until said viscosity begins to decrease.

3. A modified starch comprising 70–98% by weight of starch, and 1–30% by weight of an alkali metal aluminate, said starch having been prepared by cooking an aqueous suspension of said starch with the alkali metal aluminate at a temperature of at least 60° C. and less than 100° C., for at least sufficient time for the viscosity of said suspension to reach 75% of its maximum.

4. A modified starch of the type of claim 3 wherein said cooking has been continued after attainment of maximum starch-alkali metal aluminate viscosity, until said viscosity begins to decrease.

5. An aqueous mixture containing the modified starch of claim 3.

6. An aqueous mixture containing the modified starch of claim 4.

References Cited by the Examiner
UNITED STATES PATENTS 2,105,052    1/1938    Oltmans _____ 162—175
2,601,597    6/1952    Daniel et al. _____ 162—164
3,058,873    10/1962   Keim _____ 162—164

DONALL H. SYLVESTER, *Primary Examiner.*

S. LEON BASHORE, *Examiner.*